June 15, 1926.
D. B. YOUNG
1,588,832
AUTOMATICALLY OPERATED RECIPROCATING TOOL
Filed Feb. 21, 1924
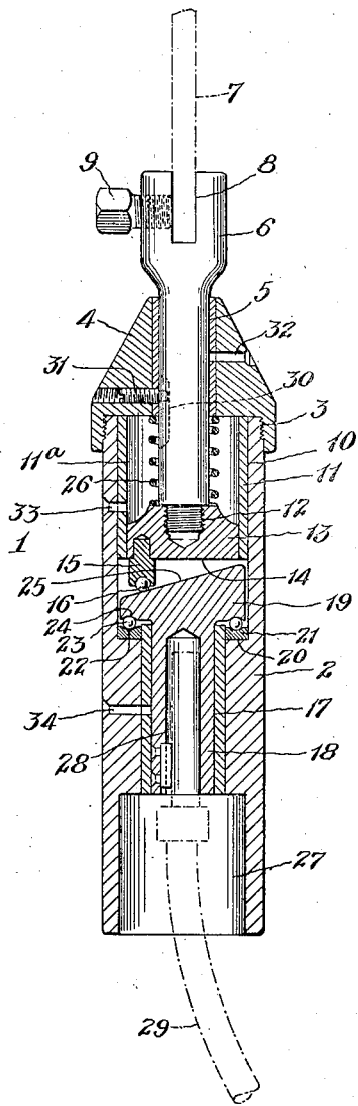
INVENTOR:
DONALD B. YOUNG.
ATTORNEY Patented June 15, 1926.

1,588,832

UNITED STATES PATENT OFFICE.

DONALD B. YOUNG, OF CLEVELAND, OHIO.

AUTOMATICALLY-OPERATED RECIPROCATING TOOL.

Application filed February 21, 1924. Serial No. 694,382.

My invention relates to automatically operated reciprocating tools, its object being to produce a tool of this character which is portable, which may be manufactured economically, and which will efficiently perform its function.

Said invention consists of means hereinafter fully described and particularly set forth in the claim.

The invention is particularly directed to that class of reciprocating tools in which the rotary motion from a flexible shaft may be transmitted to a suitable rotatable element in the tool, and the rotation from the latter converted into a reciprocating motion of the chuck member, by means of a cam action. I am aware that the rotary motion of a tool member has been converted into a reciprocating motion by means of a cam. Heretofore, however, the form of this cam has been such that in the course of such conversion the operation has been such as to produce excessive vibration and lack of uniformity of action, as a result of lack of uniformity of the shape of the cam.

My invention is therefore particularly directed to the form of the cam used in converting the rotary into a reciprocating motion, as well as to other details of construction which will be hereinafter fully described.

The annexed drawing and the following description sets forth in detail certain means embodying my invention, the disclosed means, however, constituting but one of the various mechanical forms in which the principle of the invention may be employed.

In said annexed drawing, the figure represents an axial section of the tool showing the chuck member in elevation.

The illustrated member of my invention comprises a body-member 1 which consists of a cylindrical tubular member 2, one end of which is provided with threads 3 which receive the threaded end of a conical head 4. This head is provided with a longitudinal bearing 5 in which is seated the reciprocal chuck member 6. The outer end of this chuck member is adapted to receive the tool proper 7 (shown in dotted lines). This chuck member 6 is provided with a slot 8 and the set screw 9 for removably securing the tool 7 in place.

That end of the member or barrel 2 adjacent to the head 4 is provided with the cylindrical axial bore 10, co-axial with the bore 5. This bore is provided with a suitable bushing 11. The inner end of the chuck member 6 is threaded as at 12 and upon this threaded end is screwed the cylindrical guide 13 which slides in the bore 11ª of the bushing 11. The inner end surface 14 of this guide has projecting therefrom the eccentrically located pin 15 whose extremity is provided with the bearing ball 16.

Connected with the bore 10 is a bore 17 of smaller diameter and coaxial with the member 2 in which is seated a rotatable member 18 whose inner end is formed with a cylindrical enlargement 19. Seated on the shoulder 20 formed by the described bores, is a bearing ring 21 provided with a ball-race 22 in which are seated balls 23 engaging a ball-race 24 formed on the under side of the enlarged member 19.

The inner end face 25 of the member 19 lies in a flat plane which is angularly related to the axis of the tool. This inner face, therefore, will form an ellipse.

Interposed between the head 4 and the guide 13 is a coil-spring 26 which holds the ball 16 of the pin 15 in contact with the cam-face 25.

The lower end of the device is provided with the open bore 27 which gives access to the lower end of the member 18. This lower end is provided with a bore 28 which is adapted to receive, and being fixedly engaged with, a flexible shaft 29 (shown in dotted lines), the manner of making such connection being well known and understood by those skilled in the art.

The chuck member 6 is provided with a longitudinal slot 30 which is engaged by the inner end of a screw 31 whereby rotation of this member is prevented. Suitable oil holes, 32, 33, and 34, are provided for suitably lubricating the various bearings.

The rotation of the shaft 29 effects the rotation of the member 18 and, hence, the rotation of the cam surface 25. The contact of the latter with the ball 16 effects the reciprocation of the chuck member 6 and, hence, of the tool 7 secured thereto.

It will be seen that by means of the above described arrangement the chuck member 6 may be readily detached by backing up the screw 31 and unscrewing such member from the guide 13. By then removing the head 4 the spring and guide may be removed from the end of the barrel. This gives ready access to the member 18 which may be withdrawn from the same end of such barrel.

Furthermore, by making the cam surface a single flat surface, I have found that a smooth, uniform action is secured, which is very advantageous, and especially when this tool is used in connection with very fine and accurate work, such as die-making.

What I claim is:

In a device of the character described, the combination of a body-member consisting of a cylindrical barrel and a removable head, said body-member provided with an end axial bore closed by said head and a bore of smaller diameter open to the other end of said barrel and communicating with said first-named bore, whereby an interior shoulder is formed; a reciprocable chuck member mounted in said head and having its inner end provided with a guide slidably engaging the interior surface of said first-named bore, said guide having a flat surface at right angles to the axis of said bore and an eccentric contacting member projecting from the inner end surface thereof; a rotatable member mounted in said second-named bore and having an enlarged inner end portion supported by said shoulder and whose inner extremity forms a single flat plane at an angle with the axis of said rotatable member; and means arranged to maintain contact between said contacting member and said angularly arranged flat plane.

Signed by me this 22nd day of January, 1924.

DONALD B. YOUNG.